July 12, 1927.  1,635,508
L. S. SHIVELY
FLEXIBLE BEAM CONNECTION FOR STEELYARDS
Filed June 16, 1925  2 Sheets-Sheet 1

Inventor
Louis S. Shively
By Cornwall, Birdell & Janus
Attys.

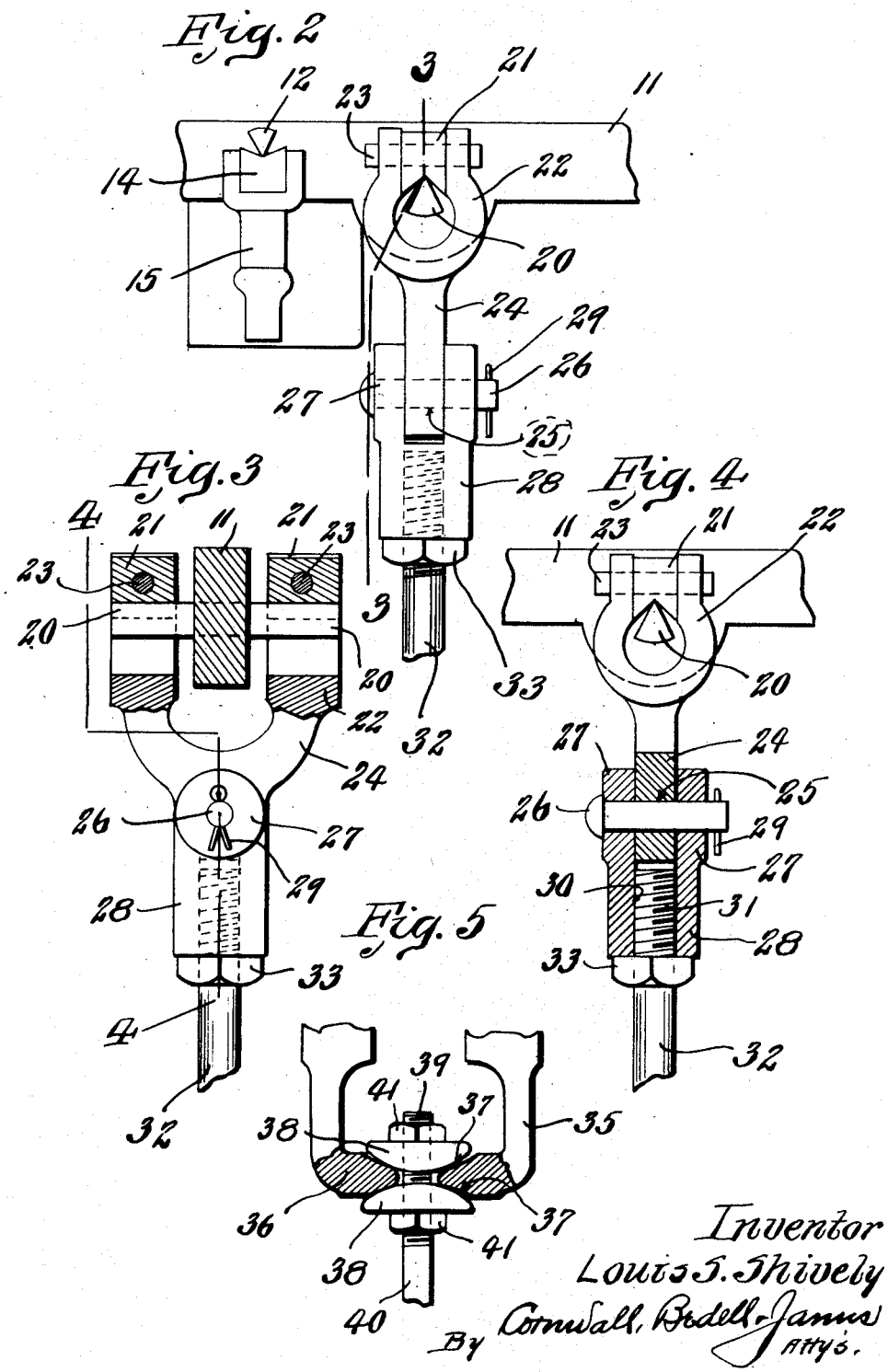

Patented July 12, 1927.

1,635,508

UNITED STATES PATENT OFFICE.

LOUIS S. SHIVELY, OF UNIVERSITY CITY, MISSOURI, ASSIGNOR TO THE WEIGHTO-GRAPH COMPANY, OF ST. LOUIS, MISSOURI, A CORPORATION OF MISSOURI.

FLEXIBLE BEAM CONNECTION FOR STEELYARDS.

Application filed June 16, 1925. Serial No. 37,475.

This invention relates to new and useful improvements in scales, the objects of the invention being to provide an improved connection between the scale beam and the steelyard in order to permit the latter to assume position out of alignment with the beam without displacing or injuring the knife-edge pivots connecting said beam and said steelyard.

Further objects of the invention are to provide a flexible connection between the steelyard and the beam whereby the former can be moved into angular displaced position with respect to said beam without subjecting the knife edges of the pivotal connections thereof to undue strain or injury.

With these and other objects in view, my invention consists in certain novel features of construction and arrangement of parts, hereinafter more fully described and claimed, and illustrated in the accompanying drawings, in which—

Figure 2 is an enlarged front elevational view of said connection with the same and the steelyard broken away.

Figure 3 is a vertical cross section taken on line 3—3 of Figure 2.

Figure 4 is a vertical cross section taken on line 4—4 of Figure 3.

Figure 5 is a detail cross section showing a modified form of connection.

Figure 1:
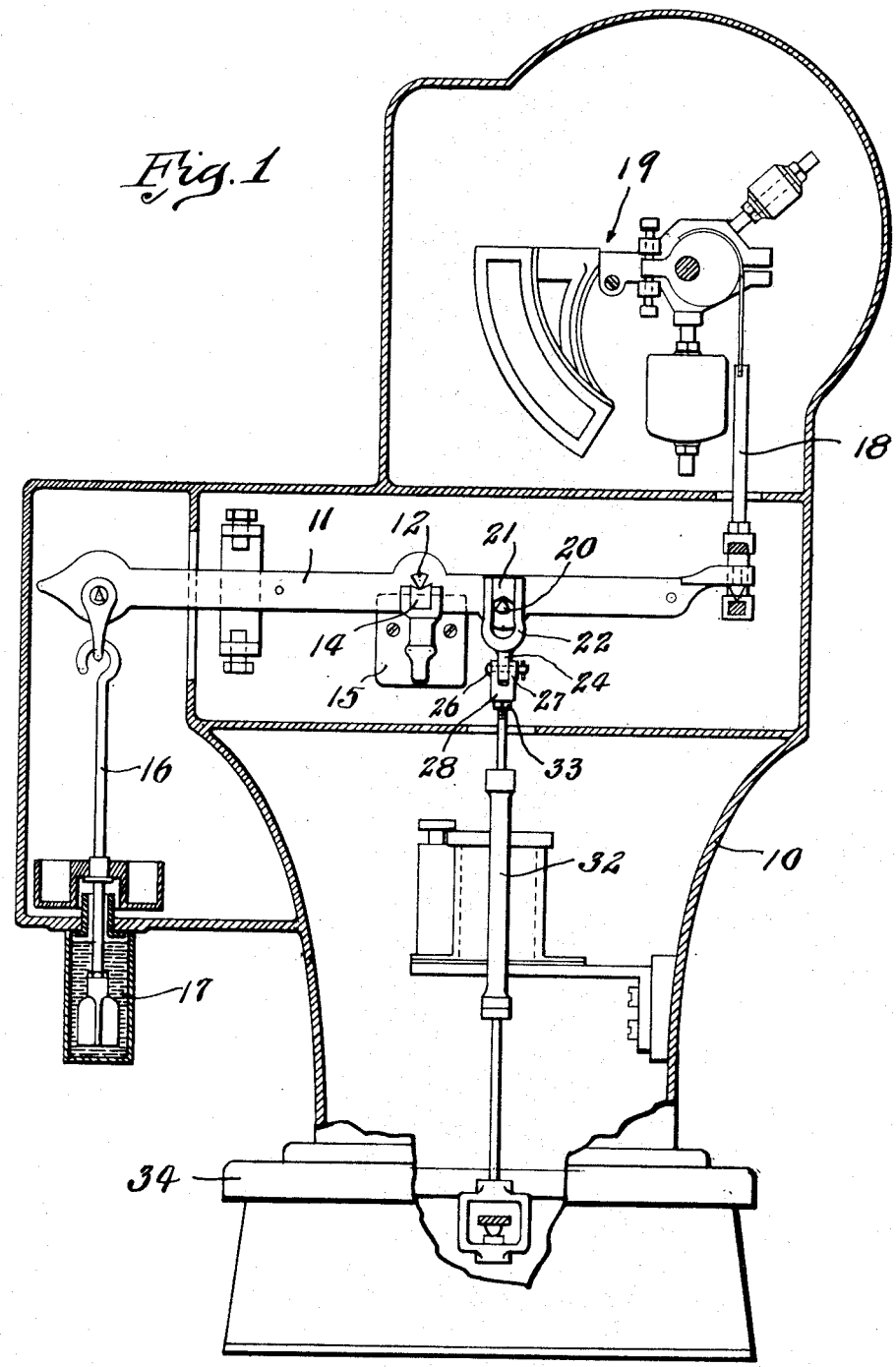
Figure 1 is a vertical cross section through a scale equipped with my improved connection.

Referring by numerals to the accompanying drawings, 10 indicates a housing enclosing a suitable scale mechanism, such as disclosed in a copending application, Serial Number 507,492, filed October 13, 1921. A beam 11 is supported in said housing intermediate its ends by a knife-edge bearing 12 which operates in a block 14 carried in a bracket 15 which is fixed to one of the walls of said housing. A rod 16 connects the beam to a stabilizer device 17 and a connection 18 operatively interengages said beam with a suitable weight indicating mechanism 19. An upwardly presented knife-edge member 20 is fixed transversely in beam 11 to each side of said beam and engaging said members 20 is a pair of blocks 21 having inverted V-shape grooves for receiving the knife edges of said members 20. These blocks are supported in the slotted ends of a yoke member 22 by pins 23 and the opposite end of said yoke member terminates in a circular bearing 24, the axis of which is disposed at right angles to the axis of knife-edge bearing 20. An axial aperture 25 is formed in said bearing for receiving a pin 26, the ends of which are seated in the bifurcated end 27 of a sleeve 28. This bifurcated end straddles bearing 24 and is pivotally connected thereto by said pin. A cotter pin 29 prevents displacement of pin 26.

Sleeve 28 is internally threaded as indicated at 30 for receiving the threaded end 31 of a steelyard 32, the opposite end of which is operatively connected to a suitable lever system which supports the load receiving platform 34. A jam-nut 33 is screw-seated on the threaded end 31 of steelyard 32 and is adapted to be screwed against said sleeve 28 for locking said steelyard against accidental displacement.

In the form shown in Figure 5, yoke member 35 is provided with a horizontal portion 36 having oppositely disposed concave faces 37 which are adapted to receive the convex faces of pads 38. These pads are preferably screw-seated on the threaded end 39 of steelyard 40 and are locked in position thereon by jam-nuts 41. The horizontal portion 36 is provided with an enlarged aperture for permitting the rod 40 to freely pass therethrough.

By means of my improved connection, greater accuracy is obtained in the operation of the scale, and the knife-edge bearings of the beam are insured against injury since a movement of the steelyard out of alignment with the beam will not affect said bearings.

I claim:

1. In a scale, the combination of a scale beam, a pivot bearing carried by the scale beam, a yoke member, a connection between the yoke member and the bearing, said connection being movable on a pivot axis parallel with the beam, a steelyard, and a pivot connection intermediate the steelyard and the yoke member.

2. In a scale, the combination of a scale beam, a bearing member rigidly supported by the scale beam, a steelyard, and a member intermediate the steelyard and the bearing member of the beam, said connection having duplicate pivot engagements with the steelyard and the bearing member of the beam respectively, said pivots moving on axes at right angles to each other whereby the steelyard may be moved into angular displaced position without effecting the pivot connection with the bearing carried by the beam.

3. In a scale, the combination of a scale beam, oppositely projecting knife bearings carried by the beam, a yoke, pivoted blocks carried by the yoke and bearing upon the knife bearings, said blocks having pivot movement on an axis parallel to the beam, a steelyard, and a pivot connection between the steelyard and the yoke operable on an axis at right angles to the axis of the bearing carried by the beam.

4. In a scale, the combination of a scale beam, a yoke member having a knife edge bearing connection with said beam, a steelyard adapted to be operatively connected to a load receiving platform, and a pin for pivotally interengaging said steelyard and said yoke member, the axis of said pin being disposed at right angles to the axis of the knife-edge connection of said yoke member and said scale beam.

5. In a scale, the combination of a scale beam, a yoke member pivotally connected to said beam, a circular bearing extending outwardly from said yoke member in a direction opposite to said beam, a steelyard adapted to be operatively connected to a load receiving platform, and a member fixedly carried by said steelyard and having a bifurcated end for pivotally engaging said circular bearing.

6. In a scale, the combination of a scale beam, a yoke member pivotally mounted on said beam and provided with a lug extending in the opposite direction to said beam, a steelyard adapted to be connected to a scale platform, and a member fixedly adjustable on said steelyard and pivotally connected to said lug, the axis of said pivotal connection being disposed at right angles to the pivotal connection of said yoke member with said beam.

7. In a scale, the combination of a scale mechanism including a scale beam and a load receiving platform, and a yoke member having knife edge bearings with said beam and provided with a lug, a steelyard connected to said platform, and a sleeve screw-seated on one end of said steelyard and in pivotal engagement with said lug.

In testimony whereof I hereunto affix my signature this 1st day of June, 1925.

LOUIS S. SHIVELY.